Sept. 7, 1954   S. O. DORST   2,688,182
CERAMIC INSULATED WIRE
Filed July 16, 1951
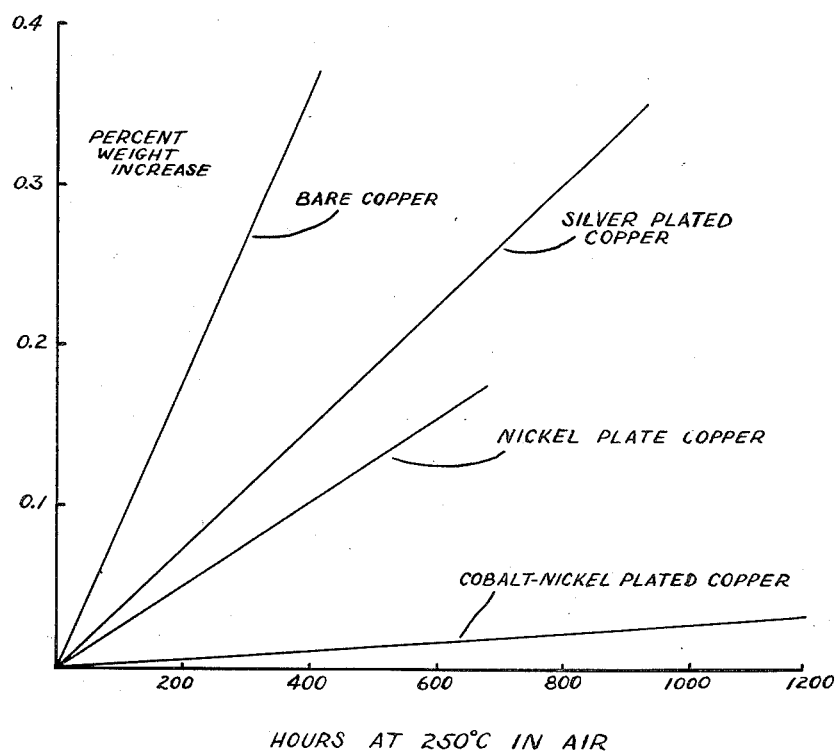
STANLEY O. DORST
INVENTOR.
BY Arthur G. Connolly
ATTORNEY Patented Sept. 7, 1954

2,688,182

UNITED STATES PATENT OFFICE 2,688,182

CERAMIC INSULATED WIRE

Stanley O. Dorst, North Adams, Mass., assignor to Sprague Electric Company, North Adams, Mass., a corporation of Massachusetts Application July 16, 1951, Serial No. 236,925

2 Claims. (Cl. 29—195)

This invention relates to new and improved ceramic coated insulating wire. This application is a continuation in part of my co-pending application Serial No. 767,740, filed August 9, 1947.

During the past 5 or 6 years, heat stable insulated electrical conductors formed with a ceramic coating have been developed. These conductors are of the types described in the Robinson et al. Patents 2,421,652 and 2,478,322 and the Dorst Patent 2,495,630. In general they are characterized by a thin layer of ceramic particles electrophoretically deposited on a wire base and bonded in position and covered with a thin layer of a resin binder such as polytetrafluoroethylene. Such insulated wires are sold under the Sprague Electric Company "Ceroc" trade mark.

There "Ceroc" type wires are very desirable for a great many usages, because they can operate at a continuous temperature of from 205° C. to 250° C., whereas the insulated wires previously known to the art could only be operated continuously at temperatures of order of 105° C. Those skilled in the art have readily realized that greater latitude in design may be obtained by use of wires with a ceramic resin coating.

It is an object of this invention to provide a base coating on electrical conductors which will more firmly hold a combination ceramic resin coating, than will a conventional electrical conductor. Other objects will become apparent from this specification and the appended claims.

According to this invention electrical conductors, such as copper wires, are preferably given a thin nickel-cobalt coating before they are covered with ceramic and resinous particles by any of the conventional methods shown and described in the aforesaid patents, or in my co-pending application. It is not known why a nickel-cobalt layer provides a more secure base for a "Ceroc" type coating than does plain copper wire. Improved and unexpected results are clearly indicated from the following results of various tests.

In all of these tests the base wire used was No. 24 gauge copper wire, and in all cases this wire was covered with a "Ceroc-Teflon" ceramic polytetrafluoro ethylene type coating approximately 0.0010 inch thick. Individual strands of the wire were provided with a layer approximately 0.000002 inch thick of either nickel-cobalt, nickel alone, or silver alone, before the application of the "Ceroc-Teflon" layer.

The resulting coated wires were tested as to how they withstood bending after being heated at 250° C. for extended periods. The results of these tests are tabulated under the following "flexibility" table which is self-explanatory.

Flexibility

| Elapsed Time | Plain | Ni-Plate | Co-Ni-Plate | Ag-Plate |
|---|---|---|---|---|
| 0 hrs | O. K. | O. K. | O. K. | O. K. |
| 168 hrs | O. K. | O. K. | O. K. | O. K. |
| 840 hrs | cracks | O. K. | O. K. | cracks. |
| 1,000 hrs | ...do... | Sl. checking | O. K. | Do. |

It is readily seen that the nickel-cobalt coated wire was the only one of the wires which successfully withstood this test.

Portions of the same four wires used in the flexibility test were also heated at 250° C. in air for extended times to determine their resistance to oxidation at this temperature. As will be seen from the figure of the drawings, which shows the results of this test, the nickel-cobalt plated wire was scarcely affected by oxidation whereas, the nickel plated copper, the silver plated copper, and the bare copper wires were all oxidized to a considerable extent.

The degree of oxidation, is extremely important if the wires are to be used at the maximum temperatures permitted by the coating for extended periods. A wire not capable of withstanding oxidation would deteriorate and break down under such usage.

Thermoplastic flow tests were also prepared on the cobalt-nickel plated, nickel plated, and on plain copper wire, all of which had been coated with a "Ceroc" type film. For these tests, two wires were crossed on a mica sheet and a 1000 gram weight was placed upon them, and they were held at a 250° C. temperature. The times required for the wires to short-out were recorded as the results of these tests.

| | Hours to Short Circuit at 250° C. | |
|---|---|---|
| | On Apparatus A | On Apparatus B |
| Cobalt-Nickel Ceroc-Teflon | 292 | 175. |
| Nickel-Plated Ceroc-Teflon | 102 | 101 (average of 5). |
| Ceroc-Teflon on Copper | 16 | |

Results of these thermoplastic flow tests indicate a marked superiority of the cobalt-nickel plated wire over either plain nickel plated wire or plain copper wire, as a base for a ceramic resin insulated layer. It is clearly shown that nickel-cobalt plated "Ceroc" coated wire may be used under much more strenuous conditions than those under which conventional "Ceroc" coated wire may be used.

In a preferred embodiment of this invention, 24 gauge copper wire is plated in a plating solution containing 240 grams of nickel sulfate, 45 grams nickel chloride, 45 grams nickel formate, 30 grams boric acid, 15 grams of cobalt sulfate, 2.5 grams ammonium sulfate, 1 gram of formaldehyde per each liter of solution. All the weights given include the water of crystallization of the compounds used. The plating was performed using a current density of 40 amps. per sq. ft., a wire speed of 18 ft./min. and a plating time of 5 seconds. The thickness of the final plated layer obtained was approximately .000005". Approximately 4% of this layer was cobalt. This thickness of coating produced in the aforesaid bath seems to provide the optimum in support for a further ceramic resinous insulation layer.

It does not appear to be practical at the present time to use any thinner plated coating than .000002, because with thinner coatings the deposit of metal may be slightly streaky and as a result the subsequent ceramic-resin coating will not have the benefit of a uniform base. The maximum practical coating thickness which may be used to provide a good support is .00001". Other current densities, wire speeds, and plating times than those indicated in the specified example may be used. Obviously other plating solutions besides the specific one indicated may also be used. As little as 2% of cobalt in the plated base is sufficient to derive the benefits from this invention. Because of the higher cost of cobalt it is not practical to use a plating solution from which a large quantity of this metal would be deposited. It is known, however, that up to 50% cobalt in the final layer is effective in providing a firm adherent base for a "Ceroc" coating.

The base coating may be provided in other manners besides electroplating. For example, the conductor may be dipped in a molten bath of nickel and cobalt, or these metals may be vaporized onto the conducting wire.

The inventive concept here involved, has been quite advantageous in producing acceptable "Ceroc" type ceramic resinous insulated conductors. It is to be understood that this invention is not to be limited by the specific examples and embodiments set forth, but is to be limited only by the scope of the appended claims.

I claim:

1. A heat resistant, flexible, abrasion resistant insulated electrical conductor comprising, a flexible copper wire, a nickel-cobalt metal layer between about 0.000002 and 0.00001 inch thick deposited on said wire, said layer having between 2 and 50% cobalt, and a ceramic coating over said layer, said coating consisting essentially of sintered-together finely divided refractory ceramic particles and a polytetra-fluoroethylene resin binder.

2. An electrical conductor suitable for extended use at temperatures of about 250° C., said conductor comprising a conductor wire, a nickel cobalt metal layer between about 0.000002 and 0.00001 inch thick on said wire, said layer containing between 2% and 50% cobalt, a ceramic coating over said layer, said coating consisting essentially of finely divided refractory ceramic particles sintered together in situ and a polytetra-fluoroethylene resin binder.

References Cited in the file of this patent

UNITED STATES PATENTS

| Number | Name | Date |
|---|---|---|
| 2,399,094 | Brown et al. | Apr. 23, 1946 |
| 2,421,652 | Robinson et al. | June 3, 1947 |
| 2,495,630 | Dorst | Jan. 24, 1950 |